United States Patent

[11] 3,594,018

| [72] | Inventor | Edward A. Graetz<br>Rte 2 Box 69, Pound, Wis. 54161 |
|---|---|---|
| [21] | Appl. No. | 848,169 |
| [22] | Filed | Aug. 7, 1969 |
| [45] | Patented | July 20, 1971 |

[54] TRANSPORT APPARATUS FOR HEAVY MACHINERY SUCH AS BULLDOZERS OR THE LIKE
3 Claims, 3 Drawing Figs.

[52] U.S. Cl. ................................................. 280/415 R,
172/240, 280/43.23, 280/150 A
[51] Int. Cl. ........................................................ B60d 7/00
[50] Field of Search ............................................ 280/43.24,
43.1, 498, 405, 406, 408, 402, 150 A, 415;
172/276, 277; 214/506, 512, 138

[56] References Cited
UNITED STATES PATENTS

| 3,169,650 | 2/1965 | Soyland | 214/138 |
| 3,333,718 | 8/1967 | Durham | 214/778 |
| 2,164,845 | 7/1939 | Steed et al. | 172/240 U (X) |
| 2,794,565 | 6/1957 | Ratliff | 214/394 |
| 3,101,854 | 8/1963 | Kampert | 280/402 X |
| 3,336,041 | 8/1967 | Bouley | 280/415 X |
| 3,378,276 | 4/1968 | Fulmer | 280/43.23 |

FOREIGN PATENTS

| 458,515 | 8/1949 | Canada | 280/415 |

Primary Examiner—Leo Friaglia
Assistant Examiner—Robert R. Song
Attorney—James E. Nilles ABSTRACT: Transport attachments for quick connection to a piece of heavy machinery for elevating the machinery off the ground for transport. A rear, hydraulically actuated attachment is easily coupled to the rear end of the piece of machinery and the hydraulic system of the machinery itself can be used to actuate the rear attachment and thereby elevate the rear end of the machinery. The front end of the machinery is elevated by clamping its vertically positionable member, such as a scraper blade, to a hitch clamp on a tractive vehicle, and the vertically positionable member is then lowered by the hydraulic system on the machinery, thereby raising the front end of the machinery clear of the ground for transport.

PATENTED JUL 20 1971
3,594,018
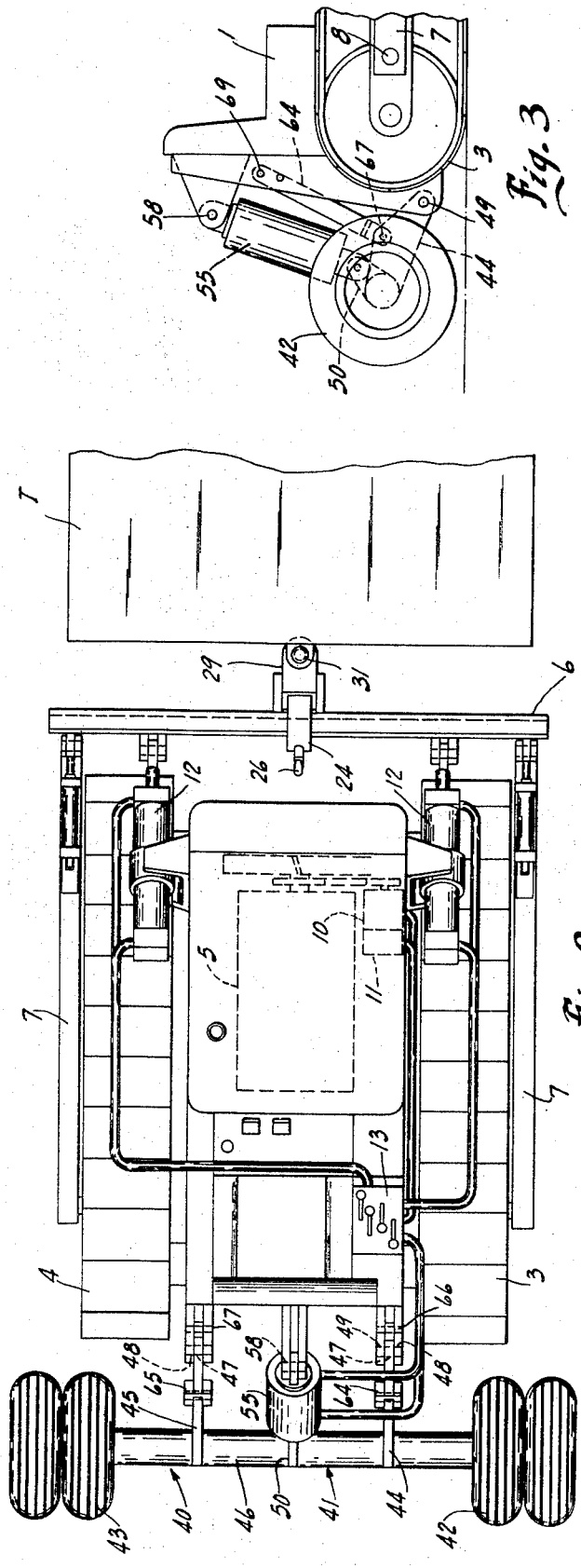
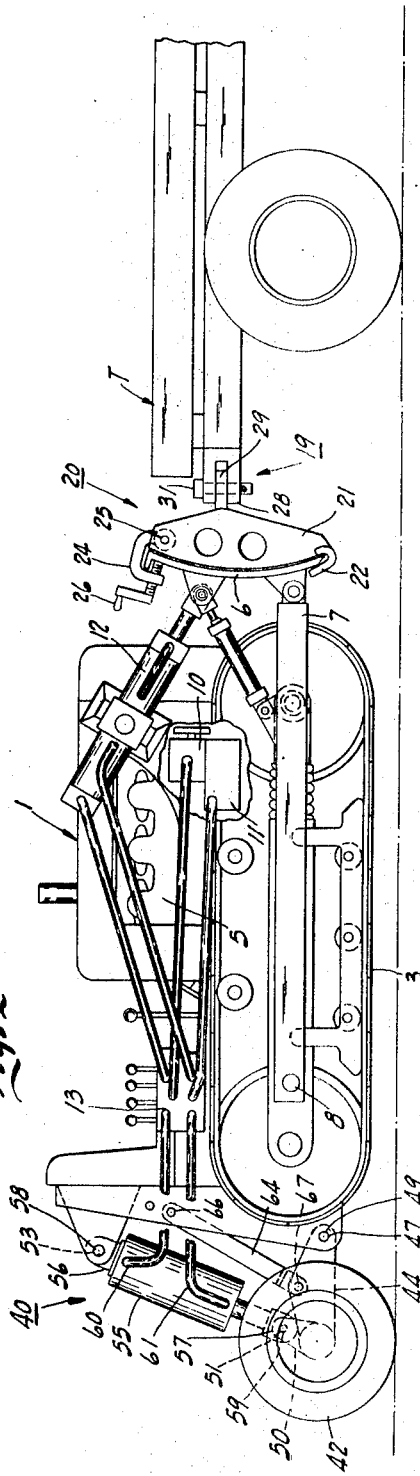
INVENTOR:
EDWARD A. GRAETZ
BY:
James E. Nilles
ATTORNEY

TRANSPORT APPARATUS FOR HEAVY MACHINERY SUCH AS BULLDOZERS OR THE LIKE

BACKGROUND OF THE INVENTION

The invention pertains to trailer devices or carriers for transporting heavy machinery such as earth working equipment. This machinery has low road speeds and must be pulled by a tractive vehicle for transport at higher road speeds from one working location to another.

Some prior art devices use special, low, flat bed trailers, which may be of the tilting or self-loading type, onto which the machinery may be driven for support thereby and for being towed by a tractive vehicle.

Other prior art devices have contemplated the use of the tractive vehicle for supporting the front end of the machinery clear of the ground and then utilizing a separate attachment for securing to the rear end of the machinery for elevated, ground traversing support of the rear end of the machinery. These latter devices had certain shortcomings however, because they required auxiliary power to load the machinery, required special tools or positioning of parts which were often difficult and time consuming to connect.

An example of a prior art device is shown in the U.S. Pat. No. 2,794,565, issued June 4, 1957, entitled "Trailer for Heavy Machinery," in which the machinery to be transported had to be first positioned in a particular manner, such as being driven under its own power on top of a pile of blocks or the like and at a particular altitude to the ground, before the necessary connections to the transport devices could be made.

SUMMARY OF THE INVENTION

The present invention provides transport attachments for heavy equipment for easily elevating the latter to a transport position without requiring any particular preparatory positioning of the machinery. A rear attachment is readily attached to the rear end of the machinery while the latter is in a normal position on the ground; the rear attachment is then actuated, for example by the hydraulic system on the machinery itself, so as to elevate the rear end of the machinery to a transport position; and stabilizer bars are then easily secured in place. The front end attachment, such as a blade hitch, is fixed, at the proper elevation for transport to the tractive vehicle, and a vertically positionable member of the machinery itself such as a scraper blade, is readily clamped to this hitch; it is then only necessary to lower the blade under power of the machinery itself, in order to thereby elevate the front end of the machinery into the transport position.

With the attachments provided by the present invention, no special prepositioning of the machinery is required in order to connect the attachments, and the machinery itself is suspended between the attachemnts and is used as the main frame of the assembly.

These and other objects and advantages of the present invention will appear hereinafter as this disclosure progresses, reference being had to the accompanying drawings.

BRIEF DESCRIPTION OF THE DRAWINGS

FIG. 1 is a side elevational view of a track-laying vehicle having a vertically positionable scraper blade and with which the present invention is shown, certain parts shown as being broken away;

FIG. 2 is a plan view of the arrangement shown in FIG. 1; and

FIG. 3 is a fragmentary, side elevational view of the rear end of the vehicle as shown in FIG. 1, but showing the rear attachment in the raised position.

DESCRIPTION OF A PREFERRED EMBODIMENT

The present invention is shown as being used with a bulldozer of the "caterpillar" type, that is with a track-laying machine 1 having a pair of endless tracks 3 and 4, an internal combustion engine 5, a vertically positionable scraper blade 6 that is swingable on arms 7 pivoted as at 8 to the frame of the machine. The machine has its own hydraulic system including a fluid pump 10 driven by the engine 5, a sump 11 for the fluid such as oil, double acting hydraulic cylinder means 12 for raising and lowering the blade under power, and suitable fluid conduit connectors 13 at the rear end of the machine.

When the machine 1 is to be transported, it can be pulled by any suitable tractive vehicle, such as a truck T, the rear end of which is only partially shown. The truck has a vertically rigid, bifurcated coupler 19 at its rear end.

In accordance with the present invention, a front end attachment 20 is provided for quick attachment to the vertically positionable member 6 of the machine. This attachment 20 comprises a blade hitch 21 of arcuate shape as shown in elevation in FIG. 1, which shape complements that of the blade 6. The lower end of the hitch 21 includes an upwardly facing hook means 22 in which the lower edge of the blade can securely and snugly rest. The upper portion of the hitch has a clamp 24 pivoted thereto as at 25 and a crank 26 is threaded in the clamp 24. The clamp can be swung over the top edge of the blade 6 and the crank then tightened against the bakcside of the blade to thereby firmly lock the hitch to the laterally central portion of the blade.

The front portion of the hitch has means for quick connection to the coupler 19 at the rear end of the tractive vehicle, and this means has been shown as a plate 29 having an eye 30 that is connected to the bifurcated coupler 19 by a removable pin 31.

The front attachment 20 can be connected to the blade before it is connected to the truck, and the blade 6 can then be raised so as to position the plate 29 in connecting relationship to the vehicle coupler 19. Alternatively, the hitch can be connected to the vehicle first and the blade then raised for engagement with and connected to the hitch.

The rear attachment 40 provided by the present invention includes a frame 41 that rotatably supports ground wheel means 42, 43 at either end. A pair of forwardly extending, spaced apart arms 44, 45 extend from the tubular member 46 of the frame and each have an aperture 47 through its forward end. The rear end of the machine frame has a pair of apertures 48 alignable with the respective apertures 47 in the arms, and pin means 49 are insertable through these apertures when aligned, thus pivotally attaching the frame 41 to the rear end of the machine.

The frame 41 also has a centrally located bracket 50 welded thereto and having an aperture 51 through its free end. The machine frame also has a central aperture 53 at its rear end, and a double acting, hydraulic cylinder means 55 is connected by its ends 56 and 57 to the frame 41 and machine 1 by means of the removable pins 58 and 59, respectively, that can extend through the aligned apertures.

Fluid conduits 60 and 61 place opposite ends of the cylinder means 55 in fluid communication with conduit connectors 13 and consequently with the hydraulic system of the machine.

When the cylinder means 55 is extended, the rear end of the machine is raised off the ground and to the transport position shown in FIG. 1. Then the stabilizer bars 64 and 65 can be attached by their bifurcated ends intermediate the length of the arms 44 and 45 of the attachment frame and to the machine frame as at 66 and 67, respectively.

Thus the rear end of the machine can be raised and lowered under its own power.

The front end of the machine can also be raised and lowered under its own power, simply by vertically positioning the blade. To raise the front end of the machine to the transport position, the hydraulic system of the machine is actuated to lower the blade, as shown in FIG. 1.

FIG. 3 shows the rear attachment in the raised position, that is when the cylinder means 55 has been contracted. In this position, the stabilizers 64 and 65 can be pinned to the vehicle frame at 69 so as to hold the attachment in the raised position.

Alternatively, the attachment can be removed completely when the vehicle is to be used for its intended purpose.

I claim:

1. Transport apparatus for heavy machinery of the type having a power operated vertically positionable front member, said apparatus being for use with a tractive vehicle having a coupler provided thereon, said apparatus comprising a front attachment and a rear attachment; said front attachment comprising a hitch clamp removably but rigidly secured to said vertically positionable front member of said machinery, said hitch clamp including hook means for engagingly receiving said vertically positionable member, said hitch clamp also including a swingable clamp for swinging over said positionable member and being removably clamped thereto said front attachment also having means for engagement with said coupler, whereby lowering of said power operated vertically positionable member causes elevation of the front end of said machinery to a transport position; said rear attachment comprising a frame having a pair of spaced apart ground wheels and a pair of forwardly extending arms, said arms being pivotally connected to the rear end of said machinery, hydraulic cylinder means connected between said frame and said machinery and actuated by power means on said machinery, whereby extension of said hydraulic cylinder means causes upward swinging of the rear end of said machinery to an elevated transport position.

2. Apparatus as defined in claim 1 including stabilizer bar means removably connected between said frame and said machinery for rigidly holding said machinery in elevated position.

3. Transport apparatus for heavy machinery of the type having fluid power means and a power operated vertically positionable front member, said apparatus being for use with a tractive vehicle having a coupler provided thereon, said apparatus comprising a front attachment and a rear attachment; said front attachment comprising a hitch clamp removably but rigidly secured to said vertically positionable front member of said machinery, said hitch clamp including a lower hook means in which said positionable member is supported and also including a swingable clamp for removably engaging said positionable member, said front attachment also having means for engagement with said coupler, whereby lowering of said power operated vertically positionable member causes elevation of the front end of said machinery to a transport position; said rear attachment comprising a frame having a pair of spaced apart ground wheels and a pair of forwardly extending arms, said arms being pivotally connected to the rear end of said machinery, hydraulic cylinder means connected between said frame and said machinery and actuated by said power means on said machinery so that extension of said hydraulic cylinder means causes upward swinging of the rear end of said machinery to an elevated transport position, and stabilizer bar means removably connected between said frame and said machinery for rigidly holding said machinery in elevated position; whereby said attachments can carry said machinery in elevated position with only said machinery serving to operatively connect the front and rear attachments together.